United States Patent
Kanarek

(10) Patent No.: US 10,630,095 B1
(45) Date of Patent: Apr. 21, 2020

(54) VOLTAGE REGULATING APPARATUS FOR A BATTERY PACK

(71) Applicant: Ross Kanarek, Great Neck, NY (US)

(72) Inventor: Ross Kanarek, Great Neck, NY (US)

( * ) Notice: Subject to any disclaimer, the term of this patent is extended or adjusted under 35 U.S.C. 154(b) by 0 days.

(21) Appl. No.: 16/372,494

(22) Filed: Apr. 2, 2019

(51) Int. Cl.
| | | |
|---|---|---|
| *H02J 7/00* | (2006.01) | |
| *H02J 7/36* | (2006.01) | |
| *H01M 2/10* | (2006.01) | |
| *H02M 3/156* | (2006.01) | |
| *H01M 10/42* | (2006.01) | |
| *H02J 7/24* | (2006.01) | |

(52) U.S. Cl.
CPC .......... *H02J 7/007* (2013.01); *H01M 2/1016* (2013.01); *H01M 10/425* (2013.01); *H02J 7/243* (2020.01); *H02J 7/36* (2013.01); *H02M 3/156* (2013.01); *H02J 2207/20* (2020.01)

(58) Field of Classification Search
CPC ....................................................... H02J 7/00
See application file for complete search history.

(56) References Cited

U.S. PATENT DOCUMENTS

| | | | | |
|---|---|---|---|---|
| 2005/0225959 A1* | 10/2005 | Pohlert | .................. | G03B 15/02 362/3 |
| 2008/0180549 A1* | 7/2008 | Lee | ........................ | G03B 19/26 348/231.2 |
| 2013/0002175 A1* | 1/2013 | Shimizu | .................... | B25F 5/02 318/139 |
| 2013/0320926 A1* | 12/2013 | Kerfoot, Jr. | ........... | H01M 10/44 320/117 |
| 2015/0318581 A1* | 11/2015 | Johnson | ............ | H01M 10/4257 429/7 |

* cited by examiner

*Primary Examiner* — Robert Grant
(74) *Attorney, Agent, or Firm* — Robert J. Hess; Hess Patent Law Firm

(57) ABSTRACT

A voltage regulating apparatus the simultaneously delivers power at a voltage level and at double the voltage level as a battery mount and a battery pack mount with each other. The battery pack is equipped with a voltage doubling circuit that is activated to double the voltage in response to the mounting of the battery mount and the battery pack with each other. The activation may arise either from a resistance sense contact to close the voltage doubling circuit or a magnetic force contact that triggers a magnetic switch to close the voltage doubling circuit. A further voltage regulating apparatus to switchover between providing power from a battery pack and DC input depending upon which voltage is higher.

10 Claims, 10 Drawing Sheets

VOLTAGE REGULATING APPARATUS FOR A BATTERY PACK

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF INVENTION

Field of the Invention

The invention relates to a battery pack whose voltage is regulated to deliver power at different wide range voltages. The invention is also related to delivering power from either a battery pack or direct current supply after sampling and assessing power drawn and converting voltage.

Discussion of Related Art

The audiovisual industry utilizes audio/video equipment for production of audiovisual works. This includes cameras, lighting, monitors, audio recorders, video recorders, wireless transmitters (for audio and video), focus/iris/zoom controllers and any other production accessories, which connect to the camera for production. For the present state of the art for production, batteries are used to power such equipment for maximum mobility, ease of use and flexibility in terms of the audiovisual production environment. The batteries for such equipment are typically smart batteries, which are associated with mounting plates during use for power and data connectivity. Such mounting plates are of the 3 stud (gold mount) or V-mount types. This invention also applies to other batteries and mounting plates suitable for use in the audiovisual industry. For example, professional cameras used in the industry are made up of broadcast video and cinematic cameras. Broadcast or News camera forms always operated on a 12 volt DC (direct current) standard. Cinematic cameras, prior to digital formats (i.e. Film), operated on a 24 volt DC standard. Both voltage standards accept a wide range voltage input to support mobile battery power, rather than just constant voltage via an AC (alternating current) to DC power supply. As the battery discharges, the voltage decreases so the 12 v standard accepts 11-17 volts DC, while the 24 v standard accepts 20-34 volts DC.

Separate professional battery pack systems for the cameras were developed for both voltage standards. However, digital cinematic cameras were developed in early 2000s and typically operated on the 12 v standard. Therefore, most 24 v systems were discontinued.

Over the past 2 years, the industry has seen cinematic camera manufacturers now reverting back to the higher voltage standard of 24 v DC. This has left the industry void of efficient on-board battery solutions such as an effective and efficient v-mount or gold-mount charger, with a suitable plate mount attachment mechanism. Moreover, now, the video lighting industry has started to make lighting panels/grids with higher voltage requirements. This development is certain to continue.

Where higher voltage was necessary, camera operators either opt for a large battery "block" (picture a marine battery in a handled case) or use DC boost conversion to achieve the higher voltage. However, there are inherent deficiencies in both solutions.

The "block" battery packs are very heavy and cumbersome. Such packs require the camera to be tethered via a cable to a camera and to be placed on a supporting stand, such as a tripod. This prevents the camera from being "shoulder ready" for the cameraman to move freely.

DC boost conversion is highly inefficient and adds additional stress on the battery pack. This is because it requires more current and creates a great amount of heat (a byproduct of the inefficiency), which must then be diffused or dissipated.

Lately, battery manufacturers provide higher voltage standard on-board battery solutions to support the 24 volt DC standard. These too have limitations, as they require separate charging systems, special on-board battery mounts, and force rental facilities to inventory two separate battery protocols (12 v and 24 v) for their fleet of camera equipment.

A need exists for on-board battery solutions to both battery protocols. Such solutions must be effective and efficient for use in a typical work place environment.

SUMMARY OF INVENTION

One aspect of the present invention relates to an on-board battery pack system which can deliver both 12 v (11-17 vdc) and 24 v (20-34 vdc) wide range voltages simultaneously. The battery packs natively are a 14.4 v standard and fully compatible with current chargers in the market (including all V-mount and gold mount as well as the current mount plate hardware on the market).

The current invention provides a voltage doubling circuit into the battery packs, which accomplishes this task. The key aspect of this invention is that, by doubling the voltage, users realize a wide range voltage discharge curve on equipment, and it is over 98% efficient. This is opposed to a standard DC boost converter, which is often greater than 10% inefficient and only keeps a steady voltage.

Based on the principals of Ohm's law, with a discharge cycle, the higher the voltage, the lower the current draw on battery packs while a standard DC boost is to be designed to keep a steady voltage on the lower end of the equipment's voltage acceptance.

BRIEF DESCRIPTION OF THE DRAWINGS

For a better understanding of the present invention, reference is made to the following description and accompanying drawings, while the scope of the invention is set forth in the appended claims.

DETAILED DESCRIPTION OF THE INVENTION

Figure 1:
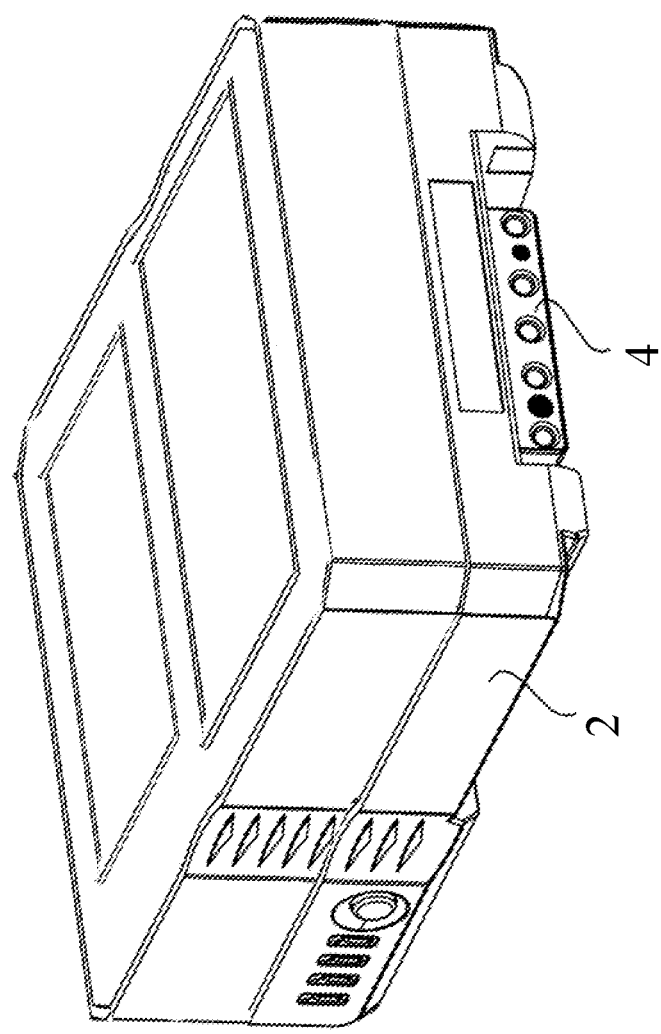
FIG. 1 is an isometric view of a V-mount battery pack with power and data terminal block.
Figure 2:
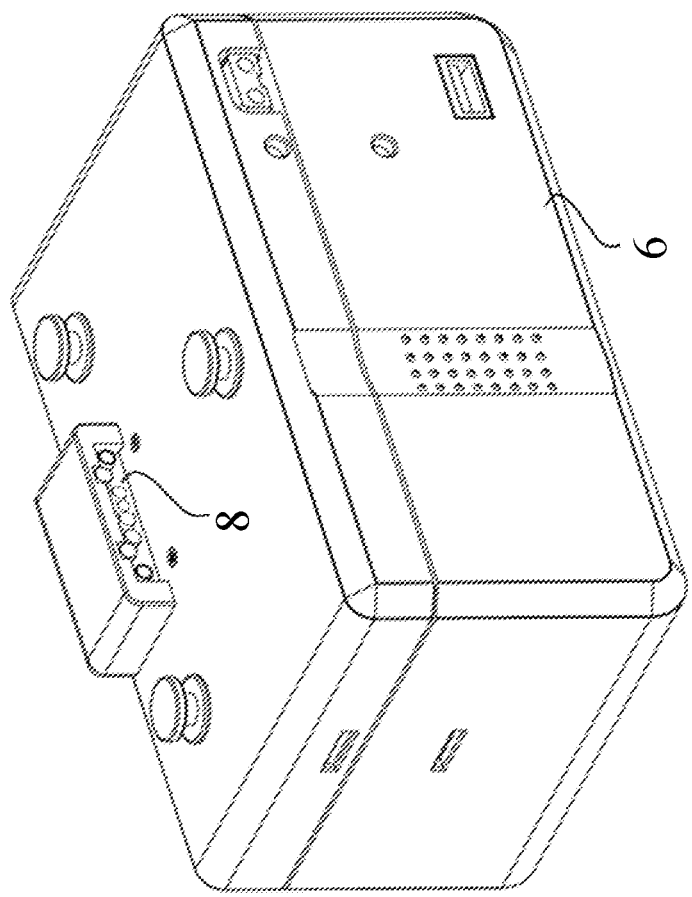
FIG. 2 is an isometric view of a gold mount battery pack with power and data terminal block.
Figure 3:
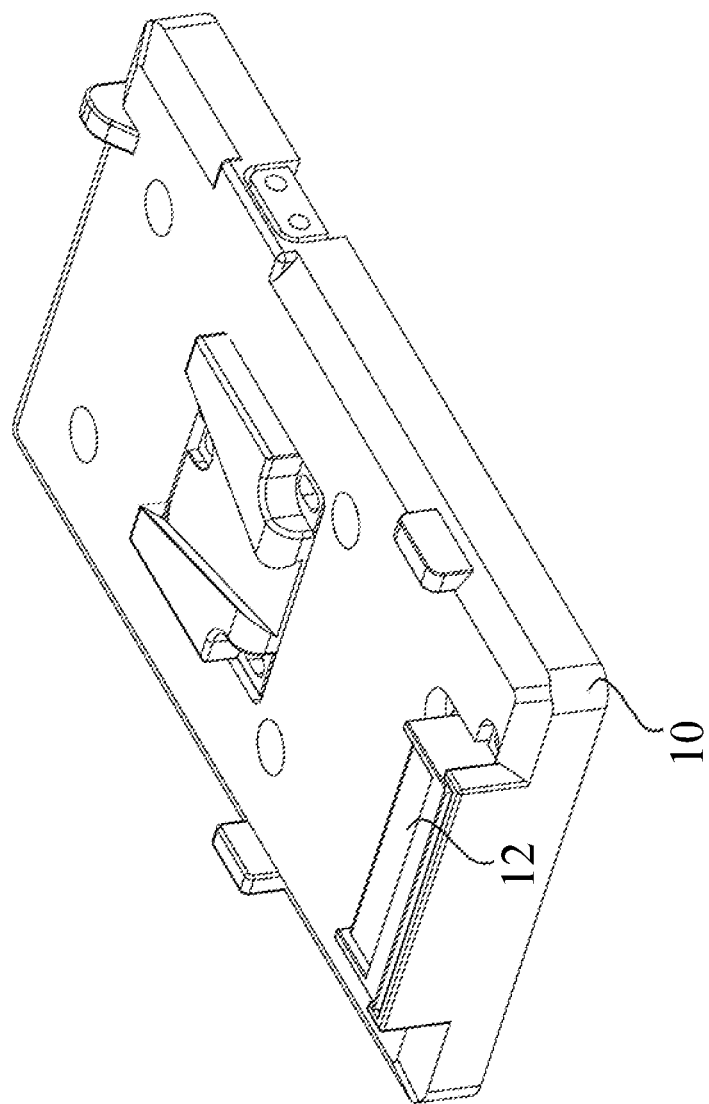
FIG. 3 is an isometric view of a V-mount plate with mating power and data terminal block.
Figure 4:
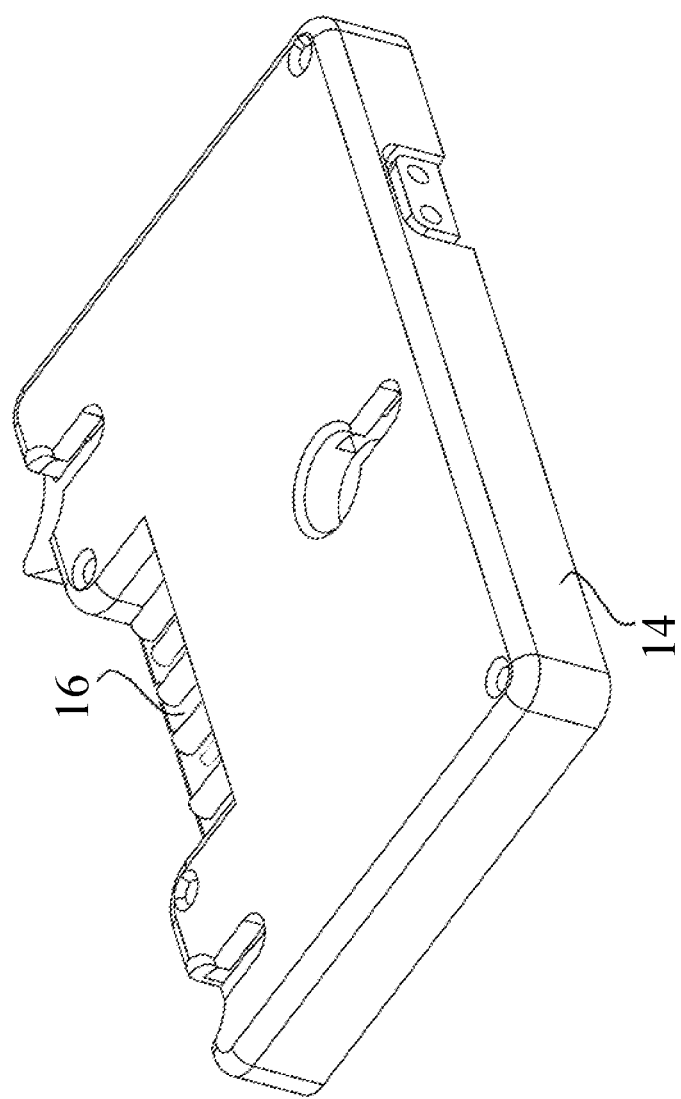
FIG. 4 is an isometric view of a gold mount plate with mating power and data terminal block.

Turning to the drawing, FIG. 1 depicts a V-mount battery pack 2 with a power and data terminal bloc 4. FIG. 2 depicts a gold mount (3-stud) battery pack 6 with a power and data terminal block 8. FIG. 3 depicts a V-mount plate (10) with a mating power and data terminal block 12. FIG. 4 depicts a gold mount plate 10 with a mating power and data terminal block 16.

The V-mount plate (1) is conventional in the art to which this invention relates, namely, the audiovisual industry. The audiovisual industry utilizes audio/video equipment for production of audiovisual works. This includes cameras, lighting, monitors, audio recorders, video recorders, wireless transmitters (for audio and video), focus/iris/zoom controllers and any other production accessories, which connect to the camera for production. For the present state of the art for production, batteries are used to power such equipment for maximum mobility, ease of use and flexibility in terms of the audiovisual production environment. The batteries for such equipment are typically smart batteries, which are associated with mounting plates during use for power and data connectivity. Such mounting plates are of the 3 stud (gold mount) or V-mount types. This invention also applies to other batteries and mounting plates suitable for use in the audiovisual industry.

Figure 5A:
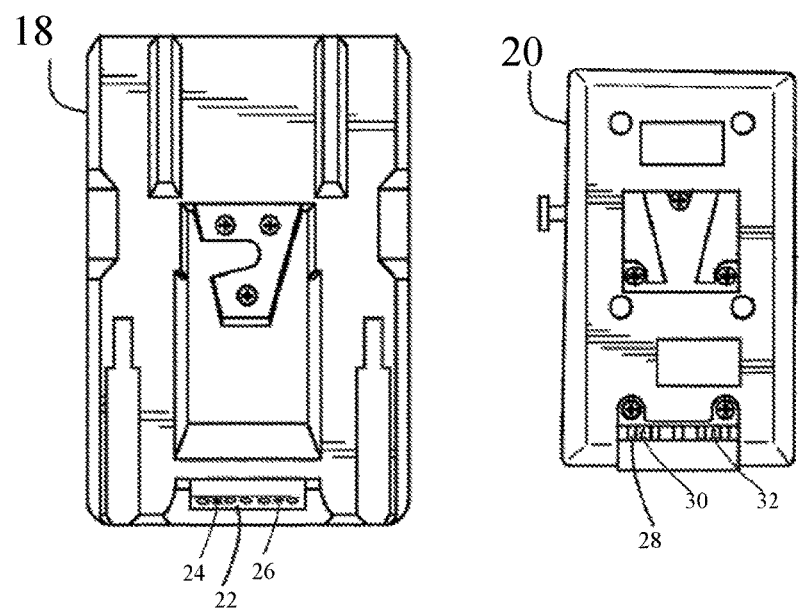
FIG. 5A is a front view of the v-mount dual voltage battery pack and the marrying v-mount plate in accordance with the invention.

FIG. 5A depicts a v-mount dual voltage battery pack (18) of the present invention with a front-view of the marrying v-mount plate (20). The power and data terminal block (22) of the invention has additional connection "pads" for the voltage doubling circuit power output (24) and for the resistance sense (26) to turn on the voltage doubling circuitry. The marrying mount plate side (20) has a power and data terminal block (28), which has aligned spring pin contacts for power (32) and a resistance sense terminal (30).

Figure 5B:
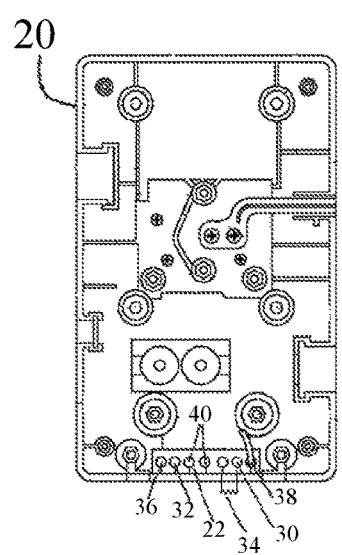
FIG. 5B is a rear view of the v-mount dual voltage battery plate of FIG. 5A.

FIG. 5B depicts the v-mount dual voltage battery plate (20) of the present invention, whose system is "backwards compatible" in that the terminal block (22) accommodates standard 12 v power to certain audiovisual equipment via positive (36) and negative (38) contacts, while the 24 v voltage-doubled higher voltage positive contact pin (32) is activated when the battery pack (18) is attached to the plate (20). Then, the resistance sense pin (30) comes in contact with the aligned battery pad (26) and activates the voltage doubling circuitry within the battery pack (18). The mount plate (20) has a resistor (34) connected to the resistance sense pin (30). The system also supports smart battery data pass communication via one or more contacts (40).

Figure 6:
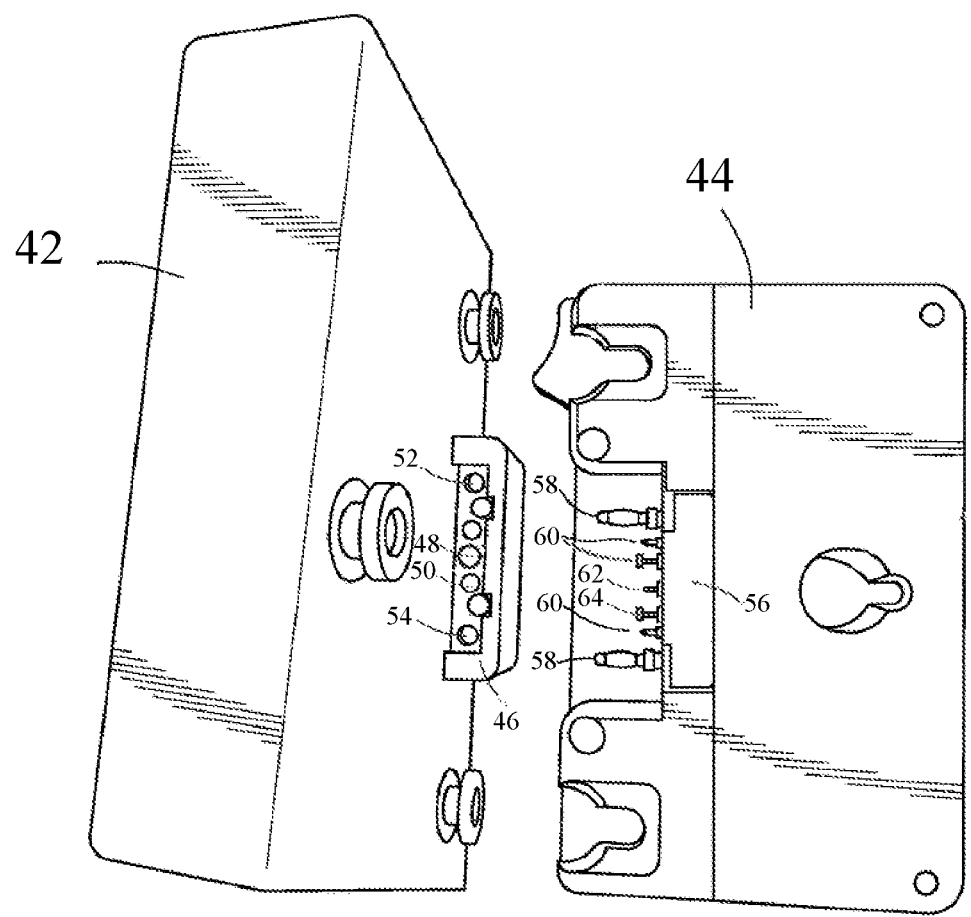
FIG. 6 is a front view of another embodiment of gold mount type dual voltage battery pack and marrying gold mount plate.

FIG. 6 shows another embodiment of a gold mount type dual voltage battery pack (42) and a front view of the marrying gold mount plate (44). The power and data terminal block (46) of the battery pack (42) on the invention has additional connection "pads" for the voltage doubling circuit power output (48) and for the resistance sense (50) to turn on the voltage doubling circuitry. The system still allows for backward compatibility for standard 12 v power to certain audiovisual equipment via pin receptacles, positive (52) and negative (54).

The marrying mount plate side (44) of FIG. 6 has a power and data terminal block (56) having aligned 12 v power pins (58), spring pin contacts for data (60), and the 24 v voltage-doubled higher voltage positive contact pin (62). The contact pin (62) is activated when the battery pack (42) is attached to the plate (44). Then the resistance sense pin (64) comes in contact with the aligned battery pad (50) and activates the voltage doubling circuitry within the battery pack (48). The mount plate (20) has resistor (34) connected to the resistance sense pin (62).

A typical 24 v cinematic camera accepts 20-34 vdc, while drawing 100 watts of power. Assume for this illustration that both circuits were 100% efficient.

The new packs of the present invention have the voltage doubling circuitry and would start at 33 v, so the calculated draw would be approximately 3 Amps (100 w/33 v=~3 A).

The alternative DC boosted circuit design would have a fixed voltage near the LOW end of the voltage range, such as 22 v. Using the same calculation, 100 w/22 v=~4.5 A.

Therefore, the same result is achieved but the present invention is 50% more efficient. Moreover, this illustration did not even take into account efficiencies/inefficiencies in the circuit design.

Now, it would be inefficient to design a voltage doubling circuit that is continually "on" in the battery pack. As mentioned above, the circuit is more than 98% efficient, but it is not wise to maintain always running. Furthermore, the invention uses the same mount plate standards as 12 v battery packs (v-mount and gold-mount) so the same power delivering terminals cannot be used. The main reason for this is that should the higher voltage be activated, that voltage must be isolated when the battery packs are used on standard 12 v equipment or it would damage the equipment.

Figure 7:
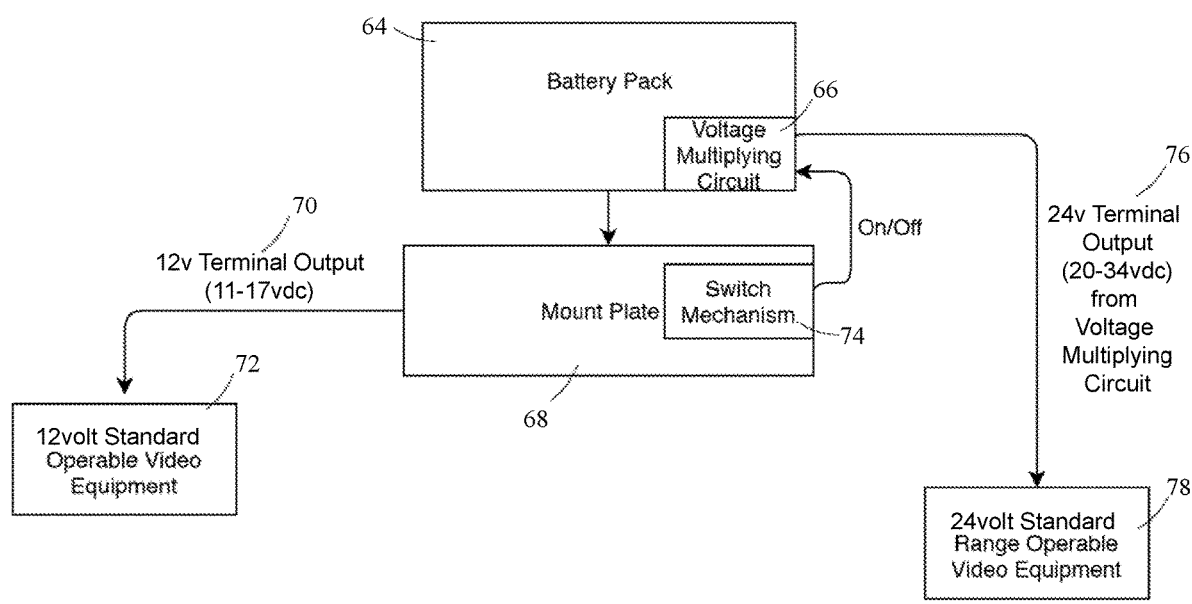
FIG. 7 is flowchart of the present invention that includes a battery pack equipped with a voltage multiplying circuit and a mount plate equipped with a switch mechanism.

FIG. 7 is a flowchart of the system, which includes the battery pack (64) with a voltage doubling/multiplying circuit (66) within. The voltage doubling circuit is dormant in the battery pack until activated. It can be activated via an ohm resistance value sense, or have a magnetic reed switch (a switch with two "fingers" which completes the circuit when a magnet brings them together).

The battery pack connects to the battery mount plate (68), which distributes power via the battery pack's 14 v terminal output (70) as that is active always to power any 12-volt standard video devices (72). The mount plate for this invention has the switch mechanism (74), which could be a resistor, magnet, etc. to marry with and activate the voltage doubling circuit by directing, (but not isolating) power to it. The voltage doubling circuit within the battery pack, along a different set of terminals (76) will then output 24 v to simultaneously power 24 volt standard devices.

Figure 8:
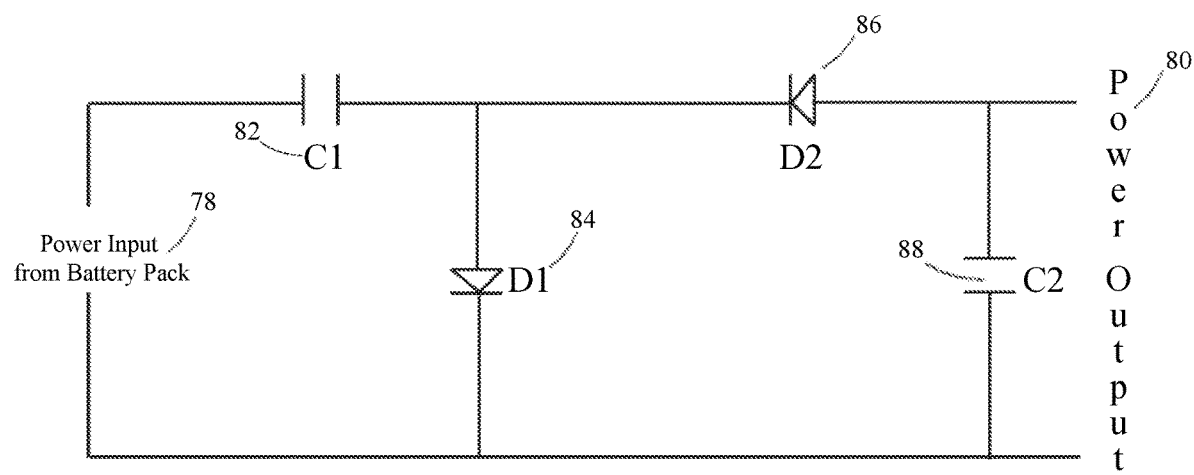
FIG. 8 is a circuit diagram of a voltage doubling/multiplying circuit incorporated into the battery pack of the present invention.

FIG. 8 shows an example of a voltage doubling/multiplying circuit. Input power (78) comes from the battery pack to activate the circuit and power output (80) is double that of the power input by the circuit. That output is used to power 24 v standard video devices. Capacitor C1 (82) is charged up to the maximum power input voltage. Diode D1 (84) is active to connect to the positive half of the voltage sine wave. The negative half of the voltage sine wave routes through Diode D2 (86) to charge up Capacitor C2 (88). The output across the C1 and C2 in series is then doubled to that of the input power voltage.

Figure 9:
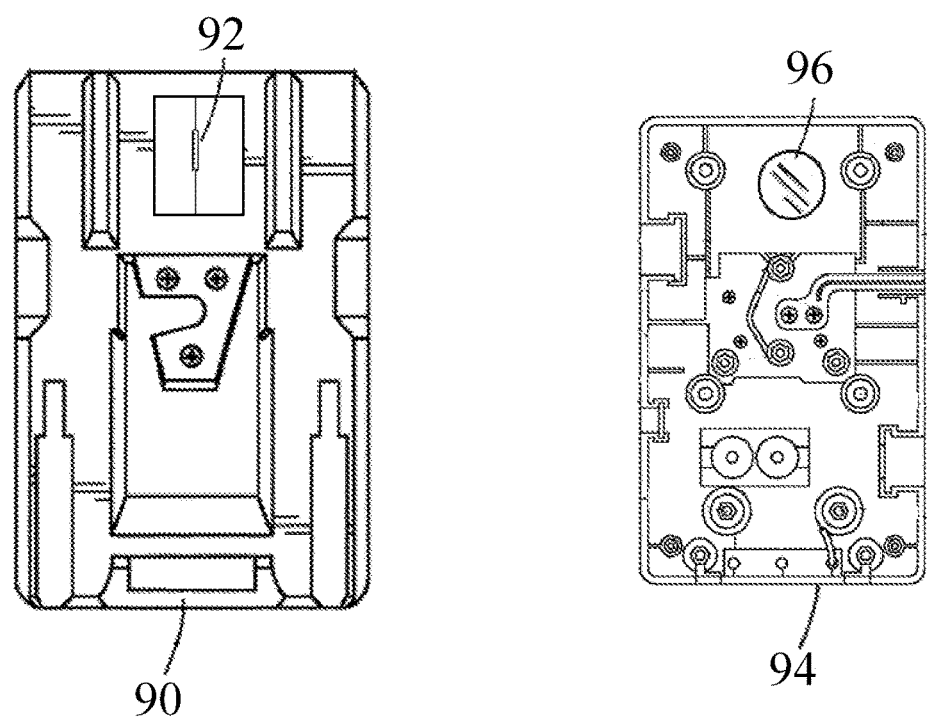
FIG. 9 is a front view of another embodiment of to voltage battery pack and the marrying mount plate in accordance with the invention that are equipped with a reed switch.

FIG. 9 shows another embodiment whereas the reed switch is the mechanism for turning on the voltage doubling circuit. The Battery Pack (90) internally has a reed switch 92). When the battery pack is connected/mounted to the battery mount plate (94), the strategically positioned magnet (96) on the rear of the mount plate, the magnetic field forces the two ferrous reeds within the reed switch to come in contact, thus completing the circuit and turning the voltage doubling circuit on. When the battery pack is disconnected from the mount plate, the switch's ferrous reeds will move apart, breaking the circuit and shutting down the voltage doubling circuit.

Figure 10:
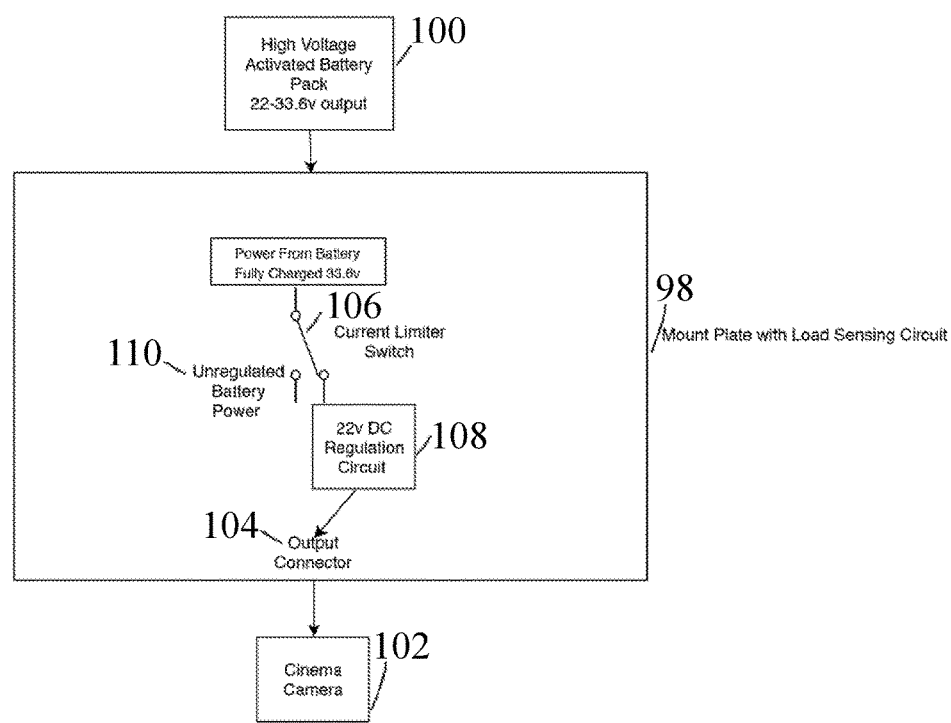
FIG. 10 is a flowchart of a current/load regulation circuit mounted within a battery mount plate.

FIG. 10 depicts a flowchart of the current/load based regulation circuit, in this instance mounted within a battery mount plate (98). The on-board mounted battery pack (100) transmits unregulated 22-33.6 v power to the Cinema Camera (102) via the mount plate with output connector (104). The power is routed through a current limiting switch (106). When power is under a predetermined current level, in this case 1000 mah/1 Ah, the power is routed through a dc regulation circuit (108) at a predetermined level, in this case 22 vdc. If and when the power draw exceeds the predetermined level on the switch, signifying the camera is disconnected from auxiliary/external power and requires on-board battery pack power, the switch will switchover to unregulated battery power (110) to provide the current necessary to operate the camera.

The way the system of the present invention is designed is three-fold.

There is a "handshake" between the battery pack with voltage doubling circuit and Core SWX's proprietary mount plate. The mount plate connects to one or more "sense" terminals on the pack. The mating sense terminal on the mount plate will have a resistor connected, which when the battery packs voltage doubling circuit senses the resistance it activates.

Another method is to place a reed switch (magnetic switch) inline with the voltage doubling circuit in the battery pack, and place a magnet on the battery mount plate end. When the magnetic force comes in contact with the reed switch, the switch closes (completing the circuit), and the voltage doubling circuit turns "on."

The other unique design of the mount plates is that they are mechanically non-restrictive to standard 12 v v-mount and gold-mount packs. There is some equipment in the industry that accepts the full range of voltage (11-34 vdc). These mount plates would allow use of any v-mount and gold mount battery packs on the market, including Core SWX's legacy packs, as well as having the option of Core SWX's voltage doubling packs.

The mount plate's terminal blocks are assembled with additional spring contacts to connect to the high voltage pin outputs. By using spring contacts, the usage of standard 14 v battery packs is not restricted. As previously mentioned, when coupled with mount plates, the high voltage output capabilities of the packs are initiated. The initialization allows delivery of the higher voltage (22-33.6 vdc) with high efficiency (nearly lossless) along additional power terminals on the battery while allowing delivery of the lower voltage (11-16.8 vdc) along the current standard mount terminals.

The value of having both 12 v dc voltage and 24 v dc voltage delivered simultaneously is to power 24 v devices (camera, follow focus) from the higher voltage, while 12 v devices (monitors, wireless video transmitters) are powered from the lower voltage.

Further, 24 v conventional battery packs may be used to power a 24 v camera but to also power a 12 v on-board monitor, it becomes necessary to use an inefficient dc converter to buck down the voltage from the 24 v battery pack to the 12 v on-board monitor.

Since the battery packs are native 12 v standard and connect to all existing equipment mount plates, they are 100% compatible with in-market battery charging equipment. The same communication is used on these packs; SMBUS/i2c protocol on V-mount, digital and analogue single-line on Gold Mount, and all battery data is received from the battery packs of the present invention. With on-camera, one can receive percentage, runtime and/or voltage. On charge, one can monitor all battery parameters including charge cycles, capacity, manufacture date, etc.

Most cinematic cameras on the market accept power two ways; through a dc input pin connector, and through an on-board battery mount. In most cases the dc input pin connector is for either a battery "block" or power supply when the camera is stationary on a tripod. The on-board battery pack is used for "handheld" or shoulder mount operation.

While it makes the most sense for the camera to always default to the dc input pin connected power (as that is usually more plentiful), some cameras do not, and resort to using the power source with the higher voltage.

In the case of the cameras described above, the camera operators use an on-board battery mount plate with a built in dc converter to deliver the camera a lower voltage then what is to be expected from the DC input power. Then the onboard mount plate may convert the voltage to a steady 22 v DC, so that the camera will continually draw from the DC input power (higher voltage)

This provides an ample solution for production, because the cameraman always knows the on-board battery pack is fully charged (yet DC converted/regulated to constant 22 v) since the camera is drawing from the higher DC input voltage (28 v). When the DC input is disconnected, the camera immediately switches to drawing power from the on-board battery pack through the 22 v DC converter, which is inefficient.

The development of voltage doubling packs poses a concern because packs fully charged, and "doubled," have output at 33.6 v. Using the standard applied 22 v DC converter is as stated, inefficient.

A similar DC converter circuit, which would accept 22-34 vdc and convert down to predetermined voltage, in this case 22 vdc, may be used, but add a power draw/current monitor component to it.

When both power sources are connected to the camera (DC input and on-board battery) the camera samples the on-board battery pack power just to insure the DC input is the higher voltage. It draws very little from the on-board pack during the sampling process.

The proposed invention would be a dc converter circuit with current monitor, which would monitor power draw/ current and at the point the draw on the dc converter exceeds a predetermined current threshold the dc converter would shut down, and the prevailing onboard pack voltage and power would be routed through without loss of power during switchover. This would occur when the DC input power would be disconnected.

This would prove to be super efficient as the regulation would only be present to trick the camera into pulling power from the higher voltage power supply until the cable is unplugged. After the switchover, the camera would operate on the native voltage of the on-board battery pack, without any dc conversion.

When DC input reconnects, a simple reset switch would be pressed on the dc converter circuit with current monitor to reinitiate the 22 v DC converter.

While the foregoing description and drawings represent the preferred embodiments of the present invention, various changes and modifications may be made without departing from the scope of the present invention.

What is claimed is:

1. A voltage regulating apparatus, comprising:
a battery pack equipped with a terminal block that has positive and negative contacts suited to accommodate power at a lower voltage, the terminal block also being configured with a voltage-doubled higher voltage positive contact to accommodate a doubling of voltage of the lower voltage to a higher voltage;
a battery mount for the battery pack and that has an audiovisual recording industry standard mounting surface configured to mount to an audiovisual recording industry device,
a voltage doubling circuit in operative connection with the battery pack to double the lower voltage to a higher voltage and arranged so that the power supplied to the audiovisual recording industry device upon mounting to the audiovisual recording industry standard mounting surface is at the higher voltage;
wherein said battery mount has a standard mount terminal and a high voltage pin power terminal, the terminal block having a spring contact that connects to the high voltage pin output terminal to thereby activate the voltage-doubled higher voltage positive contact of the battery pack and thereby enable delivery of the higher voltage along the high voltage pin power terminal while delivering the lower voltage along the standard mount terminal.

2. The voltage regulating apparatus of claim 1, wherein the battery mount is equipped to supply the power from the battery pack simultaneously to the audiovisual recording industry device at the higher voltage and to a different audiovisual recording industry device at the lower voltage.

3. The voltage regulating apparatus of claim 2, wherein the higher voltage is between 22 vdc and 33.6 vdc and the lower voltage is between 11 vdc and 16.8 vdc.

4. A voltage regulating apparatus, comprising:
a battery pack;
a battery mount for the battery pack having an audiovisual recording industry standard mounting surface configured to mount to an audiovisual recording industry device;
a voltage doubling circuit in operative connection with the battery pack to double the lower voltage to a higher voltage and arranged so that the power supplied to the audiovisual recording industry device upon mounting to the audiovisual recording industry standard mounting surface is at the higher voltage;
wherein said battery mount is equipped with a magnet that exhibits a magnetic force and a magnetic switch is arranged within the voltage doubling circuit such that as the magnetic force comes in contact with the magnetic switch, the magnetic switch closes to complete the voltage doubling circuit, which then doubles the voltage.

5. A voltage regulating apparatus, comprising:
a camera configured to pull power from a direct current input of a power supply and from the power supply of a battery pack based on a determination of which has a voltage that is higher,
a sampling circuit responsive to the DC input and the battery pack being connected to the camera by sampling drawn power from the battery pack and thereafter making a determination as to whether or not the DC input has the higher voltage than that of the battery pack;
a DC converter that converts the voltage;
a current monitor that monitors power draw/current to shut down the DC converter as a draw on the DC converter exceeds a current threshold; and
a switchover circuit responsive to disconnection of the DC input to switchover power by routing the voltage from the battery pack without incurring a loss of the power during the switchover of the power, the switchover circuit also being responsive to reconnection of the DC input to reinitiate the DC converter to commence conversion again of the voltage.

6. A method of voltage regulation, comprising the steps of:
mounting a battery mount to a battery pack, the battery pack having a power supply at a lower voltage and a terminal block that has positive and negative contacts suited to accommodate the power at the lower volt and a voltage-doubled higher voltage positive contact that activates in response to the battery mount becoming mounted to the battery pack to accommodate a higher voltage;
wherein the battery mount has an audiovisual recording industry standard mounting surface that mounts to an audiovisual recording industry device, a standard mount terminal and a high voltage pin power terminal, the terminal block having a spring contact that connects to the high voltage pin output terminal to accommodate delivery of the higher voltage along the high voltage pin power terminal while delivering the lower voltage along the standard mount terminal; and
doubling the lower voltage of the battery pack to the higher voltage with a voltage doubling circuit that is in operative connection with the battery pack and arranged so that the power supplied to the mounted audiovisual recording industry device is instead at the higher voltage.

7. The method of claim 6, further comprising:
supplying the power from the battery pack via the battery mount simultaneously to the audiovisual recording industry device at the higher voltage and to a different audiovisual recording industry device at the lower voltage.

8. The method of claim 6, wherein the higher voltage is between 22 vdc and 33.6 vdc and the lower voltage is between 11 vdc and 16.8 vdc.

9. A method of voltage regulation, comprising the steps of:
mounting a battery mount to a battery pack, the battery pack having a power supply at a lower voltage, the battery mount having an audiovisual recording industry standard mounting surface that mounts to an audiovisual recording industry device and a magnet that exhibits a magnetic force; and doubling the lower voltage of the battery pack to a higher voltage with a voltage doubling circuit that is in operative connection with the battery pack and is arranged with a magnetic switch so that as the magnetic force exhibited by the magnet comes into contact with the magnetic switch, the magnetic switch closes to complete the voltage doubling circuit and thereby double the voltage supplied to the mounted audiovisual recording industry device.

10. A method of voltage regulation, comprising:

arranging a camera to pull power from a direct current input of a power supply and from the power supply of a battery pack based on a determination of which has voltage that is higher;

providing a sampling circuit responsive to the DC input and the battery pack being connected to the camera to sample drawn power from the battery pack and thereafter make a determination as to whether or not the DC input has the higher voltage than that of the battery pack;

converting the voltage with a DC converter;

monitoring power draw/current with a current monitor to shut down the DC converter as a draw on the DC converter exceeds a predetermined current threshold; and providing a switchover circuit responsive to disconnection of the DC input to switchover power by routing the voltage from the battery pack without incurring a loss of the power during the switchover of the power, the switchover circuit also being responsive to reconnection of the DC input to reinitiate the DC converter to commence conversion again of the voltage.

* * * * *